IMMEDIATE IMAGE FORMULATION PROCESS AND APPARATUS THEREFOR

Filed June 1, 1959 4 Sheets-Sheet 1

INVENTOR.
JOHN J. KINSELLA
BY
George W. T. Simmons
ATTORNEY

IMMEDIATE IMAGE FORMULATION PROCESS AND APPARATUS THEREFOR

Filed June 1, 1959 4 Sheets-Sheet 2

INVENTOR.
JOHN J. KINSELLA
BY
George W. F. Simmons
ATTORNEY

May 28, 1963 J. J. KINSELLA 3,091,767

IMMEDIATE IMAGE FORMULATION PROCESS AND APPARATUS THEREFOR

Filed June 1, 1959 4 Sheets-Sheet 3

INVENTOR.
JOHN J. KINSELLA
BY
George W. T. Simmons
ATTORNEY

IMMEDIATE IMAGE FORMULATION PROCESS AND APPARATUS THEREFOR

Filed June 1, 1959 4 Sheets-Sheet 4

INVENTOR.
JOHN J. KINSELLA
BY
George W. F. Simmons
ATTORNEY

United States Patent Office 3,091,767 Patented May 28, 1963

3,091,767

IMMEDIATE IMAGE FORMULATION PROCESS AND APPARATUS THEREFOR

John J. Kinsella, Rochester, N.Y., assignor to Xerox Corporation, a corporation of New York Filed June 1, 1959, Ser. No. 817,349
7 Claims. (Cl. 346—74)

The present invention relates generally to the recording of computational data and more particularly to electrostatic apparatus for the inertialess recording of analog and digital information.

Computational machines, whether of mechanical or electronic design, are broadly classified as either digital or analog computers. A digital device is one performing mathematical operations with numbers in the form of digits which can only assume discrete values. In the analog computer, for purposes of computation, numbers are translated into measurable quantities, such as lengths, voltages or angles of displacement, the results being derived by the interaction of moving parts or electrical signals which are so related as to solve an equation or perform a mathematical operation.

Analog and digital computer machines, however complex in structure, are constituted by three basic components; namely, an input system by means of which a problem is introduced into the machine, an operations system including arithmetic and storage elements for carrying out the mathematical functions entailed in solving the problem, and an output system for printing or recording the results.

The written or printed values yielded by the output system may assume any one of several forms depending on the nature of the data and its eventual use. With the recent development of high speed computer machines and other mechanical and electronic devices which produce data at high rates of speed, there has arisen a concomitant need for high speed recording devices, for otherwise the printer or other recording mechanism may act to retard the operation of the entire machine. It is obvious that a computer machine can be no faster than its output system.

To meet the growing need for high speed recording, various types of improved mechanical, electronic and photographic printers have heretofore been devised. But in each prior instance, though greater speeds have been realized, there nevertheless remains a substantial inertia factor which materially limits the ultimate speed attainable.

The mechanical limitations of electric typewriters and multibar printers which act in response to punch tape signals or pulse groups are well known and need not be further considered. Gang printers are also known in which the type is located on drums rotating at constant velocity rather than on bars or levers, printing being accomplished by causing a hammer to strike the paper against the drum as the proper letter is passing by. While such gang printers are sometimes capable of printing more than 200 digits per second, their speed is still well below modern requirements.

To obviate the drawbacks inherent in mechanical bar and gang printers, flash photographic printers have been developed in which an intense light source is modulated by the computational signals, the flashes being photographed to provide a permanent record. But the speed of this device is circumscribed by the maximum rate at which the source can be modulated, as well as by the finite exposure time of the film.

The limitations of photographic techniques are also incident to the so-called "Numeroscope" in which each digit is formed on the face of an individual cathode ray tube and a picture is taken of all the tubes in a row. The smallest figure which can be photographed is a function of the graininess of the film, and the exposure time is a function of the emulsion speed. Other forms of cathode-ray printers have been developed in which the numbers are traced on a screen by a scanning electron beam, but here too it is necessary to photograph the screen image. Consequently, whatever time is gained by using a cathode-ray beam to form the numbers is lost in the photographic process serving to imprint the numbers.

In view of the foregoing, it is the principal object of the present invention to provide an electrostatic technique and apparatus for recording analog or digital information at extremely high rates of speed. A significant feature of the invention resides in the fact that the necessity for accelerating mechanical parts of any kind is altogether avoided.

More specifically, it is an object of the invention to provide electrostatic recording apparatus for the purpose described which produces a recognizable indication thereof thereby eliminating the need for development and combining this novel image forming process with standard digital computer techniques.

A further object of the invention is to provide an electrostatic recording technique in which the information is directly recorded on an insulating web without the need for subsequent devolpment permitting instant visualization of the information. The digital computer circuits which coact with the electrostatic image forming apparatus permit the logical spacial ordering of instantly visible images which owe their origin to information pulses received serially in time.

Briefly stated, in the present invention the physical symbols or characters rather than light patterns are deposited as electrostatic discharge patterns on a specially prepared web to produce a recognizable indication thereof. The web comprises an electrically insulating layer having coated thereon a thin electrically conductive film. It has been found on bringing a character face or symbol-shaped electrode into close proximity to the electrically conductive film and applying an intense electric field to produce a field discharge, there is a selective removal of the electrically conductive film in image configuration producing on the electrically insulating substrate an accurate visible reproduction of the character face or symbol-shape.

Transfer of the configuration of the symbol or character from the electrode to the insulating web is effected by the use of a relatively low potential triggering pulse which raises the electric field above the critical stress value to produce a field discharge in the space between the insulating web and the electrode. Electronic switching circuits are associated with the electrostatic apparatus to supply trigger pulses thereto in accordance with information received electrically from a digital computer or other signal source.

For a better understanding of the invention, as well as other objects and further features thereof, reference is had to the following detailed description of the invention to be read in connection with the accompanying drawing wherein.

Figure 1:
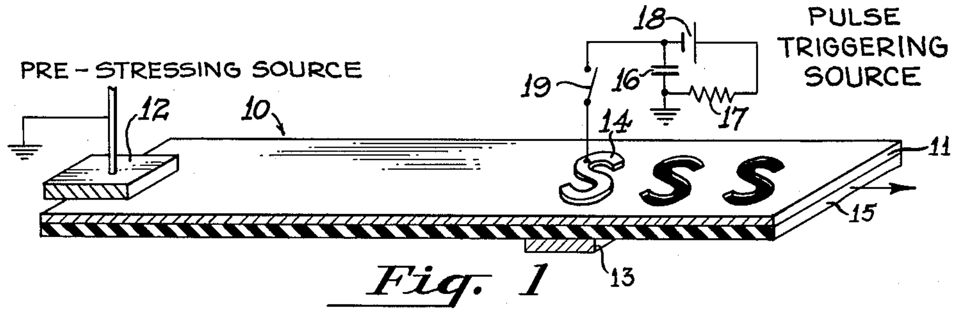
FIG. 1 is a schematic diagram illustrative of the theory underlying the instant invention.

Referring now to the drawings and more particularly to FIG. 1, which is intended to illustrate the theory underlying the invention, there is shown a web 10 comprising an insulating layer 15, such as a web of polyethylene terephthalate having coated thereon a thin electrically conductive film 11 as of aluminum which is electrically grounded 12 as shown.

The critical stress defines that value of electric field strength at which breakdown occurs. It has been found that when there is such breakdown, a transfer or charge migration through the gap takes place. If, on the other hand, the electric stress is below the critical point, dielectric breakdown is not effected and there is no charge transfer. The point at which the charge will transfer can be determined empirically or by the use of critical stress curves.

As shown in FIG. 1 the web having a grounded film of aluminum thereon passes under a shaped electrode 14 which, by way of illustration, is in the configuration of the letter S, the web below the shaped electrode being supported by support means 13 to maintain the electrode-web spacing. The triggering pulse to effect the charge transfer is produced by a condenser 16 charged through a resistor 17 by a voltage source 18, the voltage pulse being applied by a switch 19 to the shaped electrode 14. The electrostatic discharge from the S selectively removes the aluminum from the web to produce an instantly visible reproduction of the S without recourse to any separate development step. The triggering pulses may, of course, originate in a computer machine.

Among the web materials which may be used are plastic films, such as polyethylene, cellulose acetate, ethyl cellulose, polyethylene terephthalate, etc. regular dried or coated papers, glass, ceramics and the like. The web preferably has a thickness in the order of one to five mils.

Figure 2:
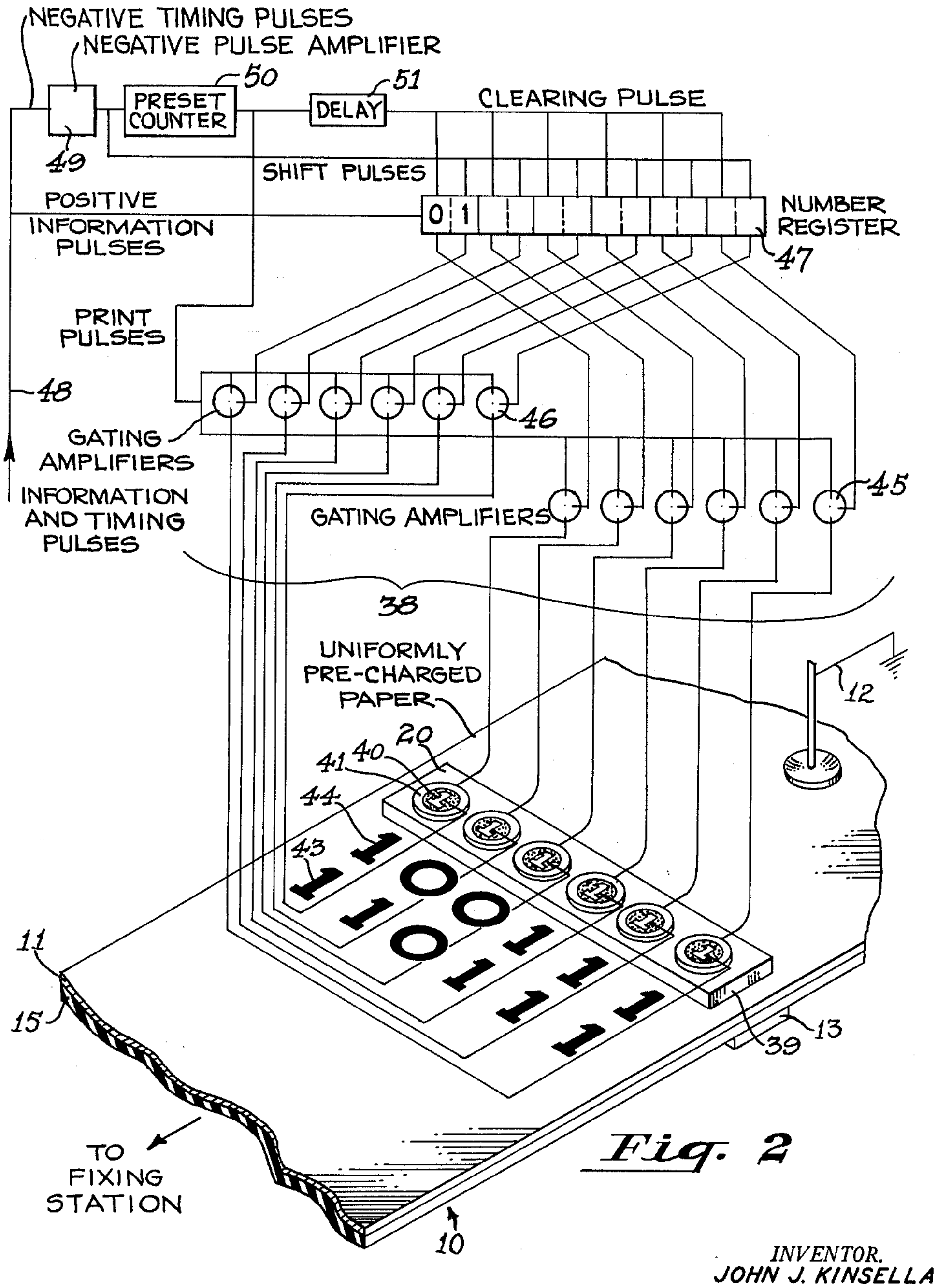
FIG. 2 is a view, partly in perspective, showing the electrostatic electrode structure of a device for use in the instant invention, as well as the associated switching circuits.

Referring now to FIG. 2, the electrode structure of the recording mechanism 20 and of the digital switching circuit 38 for applying pulses thereto is shown in greater detail. The electrode structure is constituted by an insulating strip 39 which is positioned transversely relative to the upper face of the moving web 10, a series of dual electrodes being embedded or otherwise mounted at spaced positions along the strip. Each dual electrode is made up of a conductive element 40 shaped as the numeral 1, element 40 being placed within and insulated from a second conductive element 41 which is shaped as the numeral 0.

The electrode structure, as shown in FIG. 2, is adapted to record binary numbers each of which is 6 binary digits in length, one 6 binary digit number for each line. The binary number system admits the marks 0 to 1 at each position and no others. Therefore to translate the decimal numbers 0 to 63 to binary terms, a six position binary system is required in which 0 is represented by binary 000000, decimal 1 by 000001, decimal 2 by 000010, decimal 3 by 000011, etc., and decimal 63 by 111111. The six place configuration of electrodes in FIG. 2 is suitable for recording any decimal number up to and including 63 in binary terms, but it is to be understood that the invention is by no means limited to a six place configuration.

Below the web 10 in parallel alignment with the electrode structure is a support plate 13 which maintains the electrode structure within a few mils of the web surface. Coated on the upper surface of web 10 is a thin metallic coating 11 connected to ground through plate 12. In operation, triggering pulses are applied either to the "1" or "0" element of each dual electrode, the pulses having magnitudes such that a point above critical stress is reached to produce a field discharge in the air gap between the shaped electrode and the metal-coated web, and thereby forms a physical pattern on the web conforming to the electrostatic discharge.

Assuming, for instance, that pulses are simultaneously applied to the dual electrodes whereby the shaped electrodes 110111 in the series thereof are activated, then, immediately after activation, the web will exhibit these same characters as shown along line 43 on the web. If thereafter pulses are simultaneously applied to the dual electrodes whereby shaped electrodes 100111 in the series thereof are activated, the web after development will exhibit these same characters along the next line, designated by numeral 44.

While the binary pulses from the computer arrive serially in time, by proper switching circuits electrostatic discharges from all the electrodes may be triggered simultaneously or parallel in time. In this way a line at a time can be printed. It is conservatively estimated that a new set of electrode images could be put down every ten microseconds with the structure shown herein. For a 32 digit line, this implies a printing rate of over 3 million digits per second. For characters of typewriter size, assuming six lines per inch, this means a web speed of over 1,000 ft. per second. Thus the speed of the web handling mechanism ultimately determines the printing rate, the process being independent of any developing and fixing steps.

The switching mechanism 38 for presenting the pulses simultaneously to the electrode structure includes a first set of six gating amplifiers 45 and a second set of six gating amplifiers 46, as well as a number register 47 having six stages in cascade relation. The fore section of each register stage is connected to the corresponding gate in gating set 46 and the register section to the corresponding gate in set 45. The outputs of gates 45 are connected to the "0"-shaped elements and the ouputs of gates 46 are connected to the "1"-shaped elements of the dual electrodes.

The binary pulse data is in the form of input information pulses and timing pulses, and may be obtained, for example, from a magnetic tape in the operations system of the computer. The information pulses are assumed to be positive and the timing pulses negative. These pulses are delivered serially on a single channel 48 in time sequence. The positive information pulse is used to designate a binary "1" and the absence of a pulse (blank) a binary "0." The information and timing pulses are interlaced so that a positive information pulse or a "blank" is always followed by a negative timing or shift pulse.

The information and timing pulses carried in channel 48 are applied to the input of the number register 47 as well as to the input of a negative pulse amplifier 49 which amplifies only the timing pulses, the output of the amplifier being fed to the second section in the various stages of the number register 47 to effect a shifting action. The output of amplifier 49 is also applied to a preset counter 50 which emits a single pulse after a predetermined total count is accumulated. The output pulse of the counter is applied as a clearing pulse through a delay circuit 51 to the first section of the various stages in the number register 47. The output of the preset counter 50 is also fed to the two sets of gating amplifiers 45 and 46.

To set the stage for the operation of the circuit, it is assumed at the outset that the number register 47 is cleared and that the pulse train conveyed on channel 48 begins with a positive information pulse. This pulse will insert a "1" in the number register 47. A negative timing pulse will follow which will not activate the number register but will supply a shift pulse to the number register 47 and a pulse to the preset counter 50. The preset counter is adjusted in this instance so that it will emit a pulse after a total count of six, inasmuch as binary numbers six digits long are to be printed. This output pulse from preset counter 50 is used to open the gating amplifiers 45 and 46 and also after a slight delay determined by delay network 51 to provide a clearing pulse for the number register 47. The preset counter is then in position to accept the next group of six information pulses.

Thus, in operation, the information pulses which are received serially are stored in the number register each of whose six stagers are activated in accordance with a digit in the binary number. After the binary number is read into the number register, the digits thereof are read out in parallel when the gating amplifiers are activated by the preset counter, thereby applying appropriate ignition or triggering pulses to the dual electrodes 40, 41 to form the image pattern on the web.

Figure 3:
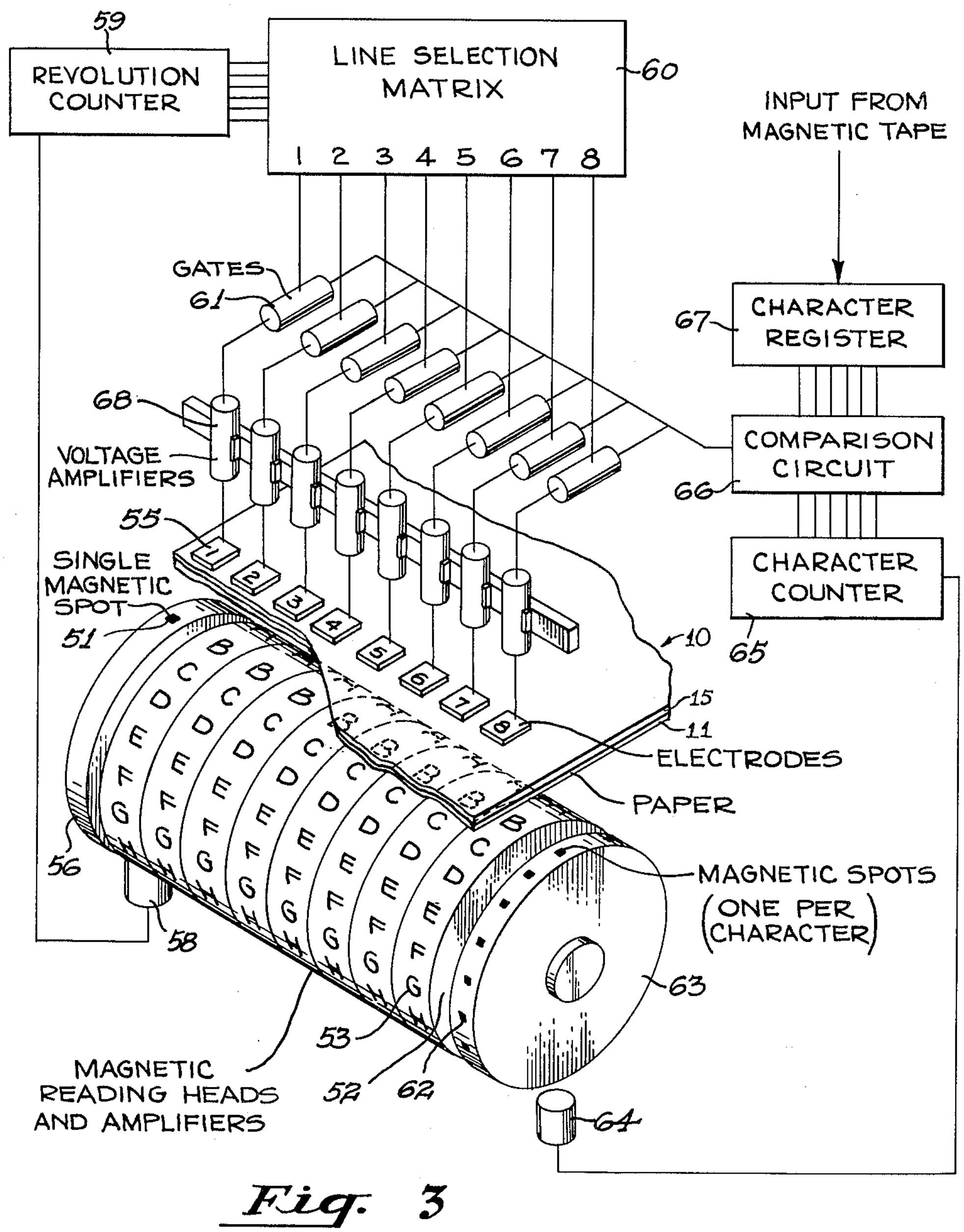
FIG. 3 is a schematic diagram of a second embodiment of an electrostatic system for recording information in the form of alphabetical and numerical symbols, the electrode structure being shown in perspective.

The printing arrangement disclosed in connection with FIG. 2 is adequate where two binary symbols or at most a few symbols are to be recorded. Where, however, it is desired to construct an electrostatic printer capable of reproducing all of the alphabetical symbols as well as the decimal digits, then it is necessary to employ, say a five by seven matrix of points at each digit position. These points must be pulsed in selective groups in such a way as to form the desired characters. Such an arrangement would entail a highly complex and expensive switching system. To overcome this drawback and to make it possible to print alphabetical as well as digital symbols, there is provided an electrostatic electrode structure as illustrated in FIG. 3.

The recording device includes a cylindrical drum 52 rotatably mounted and driven at a constant angular velocity. Circumferentially disposed at equi-spaced points about the drum are several groups of raised characters 53 formed of conductive material, each group constituting a ring. One ring of characters is provided for each column of printed page. The characters in each ring thereof are composed of the symbols A to Z and 0 to 9, for example, so that both alphabetical and numerical information may be selectively recorded.

A web 10 comprising an insulating support 15 coated with a thin metal film 11 is arranged to pass tangentially over the rotating character drum. Above the web is transversely disposed an array of stationary electrodes 55, one for each ring of characters. In operation, when a selected character passes over a chosen electrode, the electrode is subjected to a triggering pulse. The triggering pulse acts to raise the stress above the critical value to produce a field discharge between the character and the web and thereby form an image pattern having the shape of the selected character.

The manner of sequentially selecting the proper character ring and the particular character therein involves the use of digital computer techniques. For this purpose, mounted on the left hand side of the character drum 52 and rotating therewith is a disc 56 containing a single magnetic mark 57. A magnetic reading head 58 disposed below the disc picks up a pulse for each revolution of the drum, which pulse is instantly transmitted to a revolution counter 59.

For each position of the revolution counter 59, one and only one of the lines marked 1 to 8 on a line selection matrix 60 is energized, the remaining seven lines being held at ground protential. The energized line must not however activate the selected electrode until the chosen character is immediately below the electrode. The energized line is therefore connected to a gate 61 which is rendered operative only when subjected to the action of two energization signals.

The second signal or energized line activates the gate only when the selected character is under the selected electrode. This is accomplished as follows: Magnetic marks 62 are embedded at circumferentially spaced positions on a disc 63 attached to the right side of the drum, there being a magnetic mark for each character in the ring. These marks which are aligned with the characters are sensed by a magnetic head 64 disposed below disc 63 and transmitted to a character counter 65.

The number in the character counter is compared in a comparison circuit 66 with the number inserted in a character register 67 by any suitable source of input digits, such as a magnetic tape system. When these two numbers agree, an output pulse is emitted by the comparison circuit 66. At the moment line 5, for example, is activated by a pulse from comparison circuit 66, the gate 61 under line 5 will transmit a pulse through a voltage amplifier 68 to the fifth electrode 55, thus producing a discharge pattern corresponding to the selected image.

Although the drawing in FIG. 3 shows an 8 column printer, the page width could be readily increased to as many columns as desired by the use of additional character rings, associated electrodes and circuits therefor. In the structure shown, in order to print as full line across the web, the character drum must complete as many revolutions as there are columns to be printed. If the angular velocity of the drum is made very high relative to the velocity of the web, the printed line will be substantially straight across. However, to compensate for any slanting which may occur in the printing, the drum may be placed at a slight angle relative to the paper or the rings may be displaced relative to each other.

The electrostatic printer in FIG. 3 can also be made to print a full line for every revolution of the character drum, rather than for every 8 revolutions or as many revolutions as there are character rings. This may be accomplished, as shown in FIG. 4, by the use of the same character drum 52, the eight rings of characters 53 on the drum and eight fixed electrodes 55 being arranged in a switching circuit adapted to print an 8 column line for a single revolution of the drum.

Figure 4:
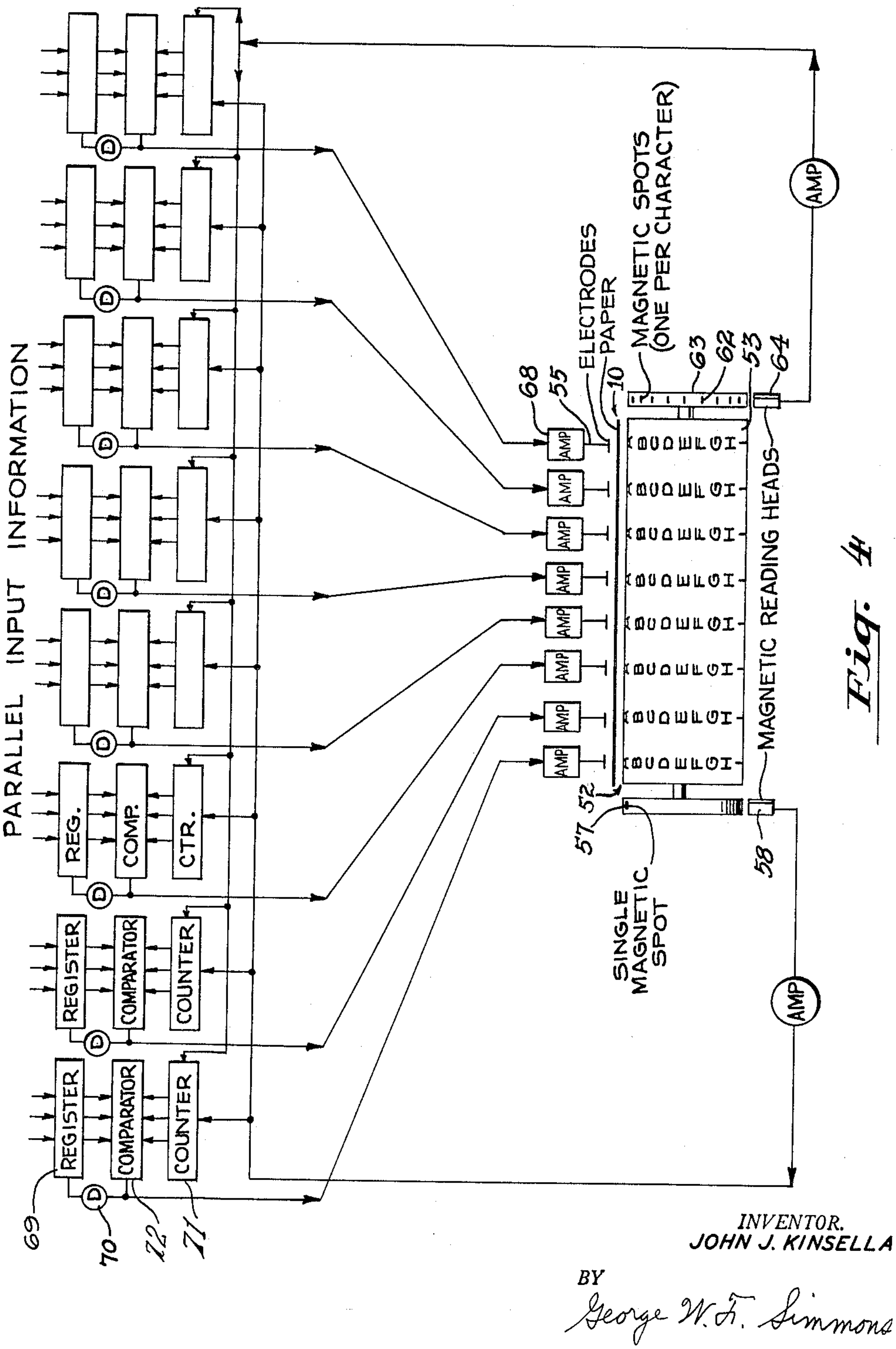
FIG. 4 is a third preferred embodiment of an electrostatic system for recording alphabetical and numerical symbols a line at a time.

In the switching circuit shown in FIG. 4 a register 69 is provided which stores the character to be printed in the corresponding column in the line. Pulses intercepted by magnetic head 64, operating in conjunction with magnetic marks 62 on disc 63, are fed to counters 71 to indicate which one of the group of characters in the rings is under the electrodes. Like characters in the several columns occupy corresponding angular positions, hence at any one instant all of the A's will be under the electrodes, then all of the B's, etc.

When coincidence occurs between the number registered in the counter 71 and the character register 69, a comparator 72 connected to both the counter 71 and the register 69 produces an output pulse which causes an electrostatic discharge to the web in the corresponding column. The pulse which causes the image transfer also clears the character register after a slight delay by means of a delay circuit 70.

Electrostatic charge patterns are transferred to the paper in random fashion until all eight images are impressed and all eight registers are cleared and ready to receive new information. The paper may then move ahead to the next line position and thereupon new information enters into the register. The printer is now ready for the next cycle.

The rate of rotation of the character drum establishes an upper limit to the number of lines which can be printed per unit time. On the other hand, there is really no lower limit to the rate at which the printing may proceed because the printer operates asynchronously and is ready to receive and reproduce information instantaneously. The upper limit at which the printer may operate in terms of lines per minute is effectively determined by the rate at which the paper may be physically advanced under the electrodes from one line position to the next.

Figure 5:
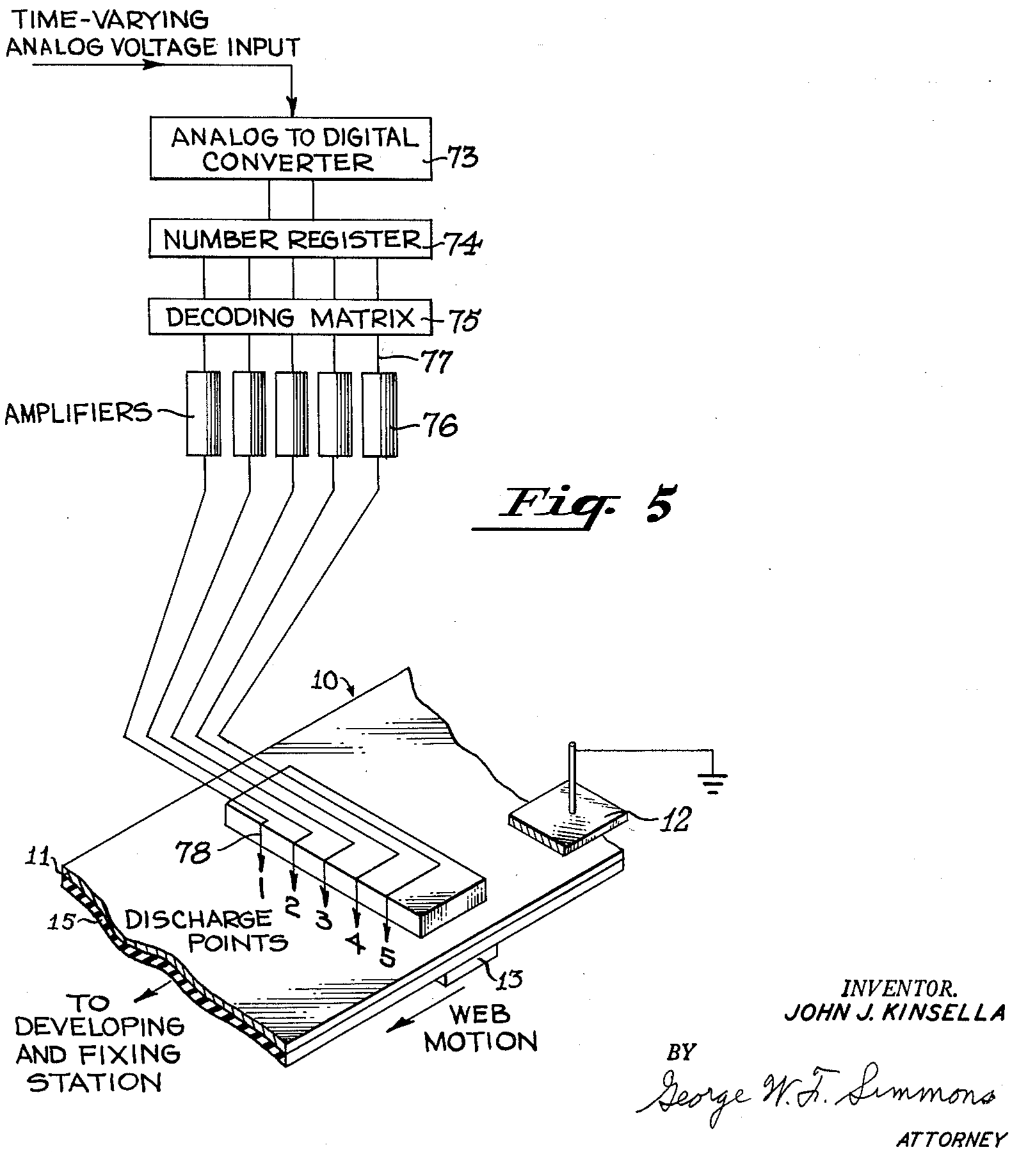
FIG. 5 is a fourth preferred embodiment of an electrostatic system for recording analog information.

The advantages of the image-forming process disclosed herein may also be utilized for the inertialess recording of analog information. The arrangement shown in FIG. 5 may be used to record a time-varying analog voltage, the recording being accomplished by first translating the analog voltage input in a suitable converter to its digital equivalent.

An analog-to-digital converter is a device, such as a digital voltmeter, which accepts instantaneous values of continuous variable qualities and expresses them in discrete numerical form. Another example of such a converter is a crystal-controlled pulse generator and an associated ring counter adapted to measure and express time intervals in discrete numbers of electrical pulses. Still another example is a device for converting speed of rotation to digital form, or mechanical counters in which electrical pickoffs at discrete positions on a shaft are used to generate electrical signals representing the angular shaft position. Any known type of analog-to-digital converter may be used within the context of this invention.

The digital number yielded by converter 73 is set up in a number register 74. The number in the register is then decoded by a line selection matrix 75 which places a potential through an amplifier 76 on only one of the several output lines 77. This potential causes a field discharge in air at a point electrode 78 which transfers a point shaped electrostatic discharge to the metal-coated surface 11 of a support web 15 by virtue of the discharge between the point electrode and layer 11 which is grounded by contact with electrode 12. Support member 13 maintains the proper spacing between discharge points 78 and layer 11. The web may be a paper coated with aluminum as by vacuum evaporation.

When the number "one" is in the register 74, the first of lines 77 will be activated, when number "two" is in the register, the second line will be activated, etc. In other words, the higher the instantaneous value of the analog voltage, the higher the number of the line which is activated. If then the paper is caused to move at a uniform rate, a series of electrostatically charged points will trace out a curve constituted by a train of dots, which is instantly made visual by selective removal of the metal film by the electric discharge as described.

The resolution which can be obtained by the above-described process depends on the accuracy required. For example a seven binary bit register can be used to control 128 output lines operating in conjunction with a like number of closely spaced point electrodes. These electrodes may readily be fabricated by standard photomechanical etching procedures. It is possible with this arrangement to obtain recording accuracies of better than 1%.

I have obtained excellent quality images using both glass and polyethylene terephthalate as substrates. As to the metal films, I have obtained excellent quality images with vacuum evaporated films of gold, aluminum, tin, chromium and copper. Generally, the gap between the shaped-electrode and the metal film has been in the order of one or two mils. The magnitude of the voltage is not very critical. I have obtained good reproduction using voltages varying from 500 to 1200 volts. Thus, the voltage is much less critical in the instant process than in Tesiprinting.

It has generally been believed in the past that electrostatic discharge occurs from a point. The use of such a discharge from a moving, pointed electrode as to trim a capacitor is old and well known in the art. The fact that such a discharge occurs from a full planar character electrode under controlled conditions to give an accurate reproduction of the full character electrode, is highly unusual and unexpected. To applicant's knowledge this is the first time that this phenomenon has been observed.

A particularly interesting and preferred embodiment of the instant invention involves the use as the image forming member of a film of specularly reflective metal on a light diffusing backing. Such a surface, when used according to the instant invention, will result in a light diffusing image on the specularly reflecting backing. There have recently been filed a series of patent applications embodying unique optical projection apparatuses and processes termed "Proxi" systems. Such systems and their use are described, for example, in Ser. No. 738,520, filed May 28, 1958 by Clark and Mott. The instant invention produces an image on an image receiving member directly and immediately applicable in a Proxi system.

The mechanism by which the conductive film is removed in the instant invention is not understood. It is believed to be caused by the heat of an electric discharge. It is possible that chemical reaction between the film (generally metal) and the highly reactive ions associated with the electric discharge cooperates in the selective removal of the film. Whatever the mechanism, the result is termed a "removal" or "decomposition" of the film.

While there have been shown what are considered to be preferred embodiments of the invention, it will be manifest that many changes and modifications may be made therein without departing from the essential spirit of the invention. It is intended, therefore, in the annexed claims to cover all such changes and modifications as fall within the true scope of the invention.

I claim:

1. In a computer machine having an input system, an output system and means for carrying out mathematical functions comprising arithmetic elements and storage elements, the combination with said output system of character recording means comprising means to bring a raised electrode alphanumeric character face on the order of a few mils from an insulating web having coated thereon a thin electrically conductive layer, and means to apply an interior electric field between said character face and said conductive layer sufficient to produce an ionizing, non-sparking, field discharge between said character face and the surface of said conductive layer resulting in the removal of said conductive layer in a region corresponding to the face shape of said electrode thereby producing an immediately visible reproduction of said electrode on said web, said combination being capable of printing output at a sufficiently high rate to allow direct coupling to computational elements of said computer machine.

2. In an information recording device including an information input system and an output system from which information is emitted in the form of electrical signals, an electrostatic recording device for recording in two-dimensional configuration the signals of said output system in the form of immediately visible images, said electrostatic recording device consisting of an insulating web member having a thin electrically conductive coating on one surface thereof which is decomposable when subjected to an electrical field discharge, electrode means comprising a plurality of electrode members spaced on the order of a few mils from the conductive coating of said member to define an air gap therebetween, means in response to a signal from said output system to energize said electrode means with a voltage pulse sufficient to effect a non-sparking electrical field discharge in said air gap between the surface of said electrode means and said coating on the web to effect selective decomposition of the web coating forming in two-dimensional configuration information of said energized electrode means on said web.

3. An electrostatic direct recording device comprising an insulating web having a thin electrically conductive coating thereon, at least one electrode having a substantially planar two dimensional end face shaped in the form of a symbol to be reproduced, the shaped end face of said electrode being spaced no more than a few mils from said conductive coating, and means to apply an electrical potential between said conductive coating and the end face of said electrode, said electrical potential being sufficient to initiate an ionizing, non-sparking, field discharge between the end face of said electrode and said conductive coating effecting removal of said coating in a region congruent with the end face of said electrode, said field discharge being the sole mechanism to form a visible image on said web conforming to said face of said electrode.

4. Apparatus according to claim 3 wherein said electrically conductive layer is a specularly reflective metal layer coated on a light diffusing base.

5. An electrostatic recording apparatus according to claim 3 in which said means to apply an electrical potential applies a potential in range from about 500 to about 1200 volts across the gap formed by the end face of said electrode and said conductive coating.

6. High speed electrical recording apparatus to produce immediately visible copy comprising: a thin electrically conductive layer coated on an insulating support member, an electrode having an alphanumeric character-shaped face, said character-shaped face being spaced on the order of from about 1 to about 2 mils from said electrically conductive layer, a power supply, connecting means between said power supply and said electrode, connecting means between said power supply and said conductive layer and means to apply from about 500 to about 1200 volts across the gap formed by said character-shaped electrode face and said conductive layer from said power supply and through said connecting means to initiate a non-sparking, ionizing, field discharge across said gap effecting removal of said conductive layer in a region congruent with the character-shaped face of said electrode.

7. The method of recording an immediately visible image comprising spacing an electrode having a substantially planar end face shaped in the form of a character to be reproduced no more than a few mils from the conductive side of a recording member comprising a thin electrically conductive coating on an insulating web, and removing portions of said coating conforming in configuration to said end face solely by applying a sufficient electrical potential between said conductive coating and the end face of said electrode to initiate an ionizing, non-sparking, field discharge between the end face of said electrode and said conductive coating forming an immediately visible image on said web.

References Cited in the file of this patent

UNITED STATES PATENTS

| | | |
|---|---|---|
| 1,801,775 | Legg | Apr. 21, 1931 |
| 1,825,551 | Serrell | Sept. 29, 1931 |
| 2,340,317 | Finch | Feb. 1, 1944 |
| 2,555,321 | Dalton et al. | June 5, 1951 |
| 2,737,882 | Early et al. | Mar. 13, 1956 |
| 2,748,487 | Zimmermann | June 5, 1956 |
| 2,784,389 | Kelly | Mar. 5, 1957 |
| 2,808,345 | Traub | Oct. 1, 1957 |
| 2,836,479 | Traub et al. | May 27, 1958 |
| 2,858,181 | Ortlieb | Oct. 28, 1958 |
| 2,930,847 | Metzger | Mar. 29, 1960 |